(12) United States Patent
Jerome et al.

(10) Patent No.: US 8,495,487 B2
(45) Date of Patent: Jul. 23, 2013

(54) WEB-BASED DEALERSHIP MANAGEMENT SYSTEM

(76) Inventors: Sandra Lee Jerome, Port Angeles, WA (US); Keith Jerome, Port Angeles, WA (US)

( * ) Notice: Subject to any disclaimer, the term of this patent is extended or adjusted under 35 U.S.C. 154(b) by 869 days.

(21) Appl. No.: 12/348,314

(22) Filed: Jan. 4, 2009

(65) Prior Publication Data
US 2010/0174571 A1     Jul. 8, 2010

(51) Int. Cl.
G06F 17/21          (2006.01)

(52) U.S. Cl.
USPC .......... 715/224; 715/226; 715/234; 707/602; 707/603; 707/607; 707/705; 707/706; 707/707; 707/758; 707/769; 707/781; 707/783

(58) Field of Classification Search
USPC ................. 715/224, 226, 234; 707/602, 603, 707/607, 705, 706, 707, 758, 769, 781, 783
See application file for complete search history.

(56) References Cited

U.S. PATENT DOCUMENTS

| | | | | |
|---|---|---|---|---|
| 5,638,501 A | * | 6/1997 | Gough et al. | 345/639 |
| 5,657,233 A | * | 8/1997 | Cherrington et al. | 705/400 |
| 5,706,494 A | * | 1/1998 | Cochrane et al. | 1/1 |
| 5,765,874 A | * | 6/1998 | Chanenson et al. | 283/67 |
| 5,774,883 A | * | 6/1998 | Andersen et al. | 705/38 |
| 5,778,178 A | * | 7/1998 | Arunachalam | 709/203 |
| 5,987,500 A | * | 11/1999 | Arunachalam | 709/203 |
| 6,029,182 A | * | 2/2000 | Nehab et al. | 715/205 |
| 6,041,310 A | * | 3/2000 | Green et al. | 705/26.41 |
| 6,128,611 A | * | 10/2000 | Doan et al. | 707/779 |
| 6,141,759 A | * | 10/2000 | Braddy | 726/14 |
| 6,856,970 B1 | * | 2/2005 | Campbell et al. | 705/35 |
| 6,867,789 B1 | * | 3/2005 | Allen et al. | 715/744 |
| 2002/0111842 A1 | * | 8/2002 | Miles | 705/8 |
| 2003/0061102 A1 | * | 3/2003 | Menninger et al. | 705/22 |
| 2004/0044688 A1 | * | 3/2004 | Brudz et al. | 707/104.1 |
| 2005/0065956 A1 | * | 3/2005 | Brown | 707/102 |
| 2005/0235203 A1 | * | 10/2005 | Undasan | 715/526 |
| 2008/0243834 A1 | * | 10/2008 | Rieman et al. | 707/5 |

OTHER PUBLICATIONS

Person; Special Edition Using Microsoft Excel 97; Dec. 17, 1996; Que Publishing; pp. 70-79, 85-91, and 878-885; included as pp. 1-41.*

Dawn Parzych; Caching Behavior of Web Browsers; Nov. 2007; F5 Networks; pp. 1-10.*

* cited by examiner

*Primary Examiner* — Doug Hutton, Jr
*Assistant Examiner* — Andrew Dyer (57) ABSTRACT

An integrated web-based dealership management system providing accounting, financial reporting, parts and service sales tracking, vehicle and parts inventory, vehicle sales tracking, and customer management software developed on a relational database on a web server and with web application tools.

4 Claims, 3 Drawing Sheets

Illustrates features and advantages of using a browser-based system for dealership management system Illustrates a record add/update form with client and server side scripts making data entry easier Figure 1a - Illustrates features and advantages of using a browser-based system for dealership management system Figure 1b - Illustrates a record add/update form with client and server side scripts making data entry easier FIG. 2 shows a flowchart of a customer check data entry process that uses server and client side scripts to automate the check data entry process Figure 3 – Overview of the technical layer architecture of the invention

WEB-BASED DEALERSHIP MANAGEMENT SYSTEM

FIELD

This invention relates generally to the field of dealership management software, and more particularly, to a method of using a relational database on a web server and web application tools to provide integrated web-based accounting, financial reporting, parts and service sales tracking, vehicle and parts inventory, vehicle sales tracking, and customer management software for automotive, truck, RV, motorcycle, and boat retail dealerships.

CROSS REFERENCE

Provisional patent filed on Jan. 7, 2008, application No. 61/010,102 by Sandra Lee Jerome, Eugene, Oreg. and Keith Jerome, Eugene, Oreg. and granted Jan. 23, 2008, "Open dealership management system developed in mySQL, PHP, HTML, and Javascript."

BACKGROUND

Automotive, truck, RV, motorcycle and boat retailers have long been automated using a more traditional form of business software based on legacy databases and their fourth generation software generation tools. Although some dealership management systems use web browsers to display stored or aggregated data from other systems, it is a normally a read-only process for the browser. Some legacy systems are moving towards using web servers to hold, clean, and transmit data, but these applications still use their legacy database to process the data and then temporary tables to hold the data that the browser then displays.

This invention uses Web 2.0 technology and a browser to directly query the relational database. This browser is the application for this invention. It uses scripting technology to process the data requests and the speed of the client and sever side scripts greatly improves the response time of the displays back the user. In addition this invention uses web application tools and relational databases.

The Internet has spawned many different sites using this open source software that enable consumers to search for vehicles and go through the process of communicating with the dealerships via a lead generation system. For example, www.cars.com is a successful site that enables users to research a vehicle, and then search for a vehicle. When the vehicle is found, then the user can make contact with a dealer by entering their user information and desired vehicle information. This data is sent via a lead generation system or emailed to the dealership.

Current dealership management systems have many shortcomings when it comes to integration with the lead generation system and online marketing websites. First, the dealership management software rarely has an import routine. Second, the database format is incompatible with the databases used in web-based sites like cars.com, making "live" integration almost impossible. Third, the development tools are very different, making it hard for the IT departments in dealerships to maintain the old legacy dealership management systems while at the same time keeping up-to-date with the latest Internet tools for consumer marketing sites. Fourth, there are more tools created every year to help dealerships market and manage their inventories for sale and interact with customers. Examples of these tools are RFID tags that enable the dealership to find the location of vehicle inventory and websites that allow consumers to make their own service appointments. These third party products are being developed in web-based tools that make integration with legacy dealership management systems difficult and often require double entry of data by the users.

With the current dealership management systems being limited in their ability to interface with the online websites that market vehicles to the consumers and their lead generation software, there is a need for a dealership management system that uses the same development tools as consumer websites and is open source and browser-based in its design to enable live integration with websites, lead generation software, and other third party tools created to manage a retail dealership's operation. This invention is novel because it uses tools that were intended to create websites to develop a dealership management system.

The previous generation of web tool would have made this invention almost impossible. The objective of that generation of the Internet was to provide an attractive read-only web site for shoppers. With the recent evolution of the Internet from read-only to Web 2.0, this enables users to not only read but to easily write to applications, thus providing a new opportunity to invent a rich Internet application that replaces the legacy database systems managing dealerships.

SUMMARY

According to one embodiment, a method of using a browser for managing the financial, customer, and inventory data of a retail dealership is provided. The Internet has trained users how to use browser displays of lists to search, sort, or filter data. Without instruction, users can naturally click on each column expecting a sort of account numbers in the general ledger display because it is the same method used when they are shopping on the Internet and want to sort prices from low to high. They can also use advanced filtering to find a range of data. With current legacy systems, sorts and filtering are normally done with report writers or complicated input forms. This visual one-click creates a new and novel way to display dealership management system data.

In another aspect, individual records are displayed in a tabbed format for the ease of adding or editing records. By breaking up the data into manageable tabs, the users can quickly find and edit the data they need. To further make it easier for the users, client-side scripting tools make entering data simple. The user types a few letters of the account number or part number and the application suggests the rest. Drop down selections keep the data consistent. Compared to legacy systems, this is an easier user interface and concentrates on the speed of data entry.

In another embodiment, using server side scripts speeds up the query of the data and complicated calculations. A dealership management system has the burden to not only display stored data, but to also process data. This trim, fast, and open scripting language was created to speed up access on the Internet and has been kept fast because typical Internet sites using server side scripting languages handle millions of requests. Although, not thought considered to be a business development tool, this invention recognized the speed of server side scripting as a solution to not only improve database queries, but to perform the numerous calculations required of a dealership management system like deterring monthly payments or creating complicate inventory stock orders.

In yet another embodiment, the architecture design of this system that integrates web application tools into the web form and scripting code prevents the need to query the database again and again to provide previews of linked information. This improves the performance of the relational database by minimizing access. Database performance has always been a speed issue for legacy dealership management systems and this invention solves the speed issue with this embodiments.

The foregoing and other objects, features, and advantages of the invention will become more apparent from the following detailed description, which proceeds with reference to the accompanying figures.

DETAILED DESCRIPTION

Described herein is a method and system for an open browser-based dealership management system and more particularly, a method of using web-based tools to provide accounting, financial reporting, sales tracking, and customer management for automotive, truck, RV, motorcycle, and boat retail dealerships.

Figure 1A:
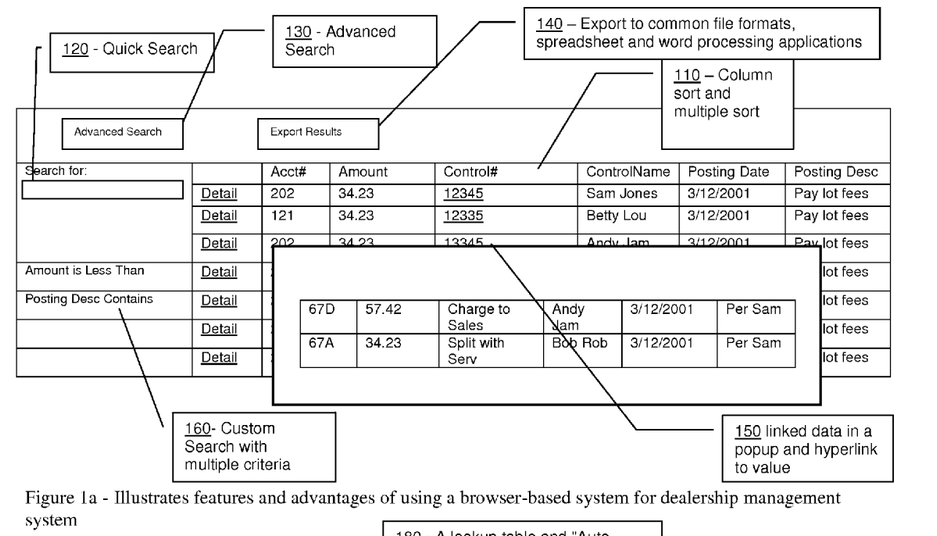
FIG. 1a Illustrates features and advantages of using a web-based dealership management system FIG. 1b Illustrates a record add or update form with client and server side scripts FIG. 2 Shows a flowchart of using client and server side embedded scripts on a form to update the database
Figure 1B:
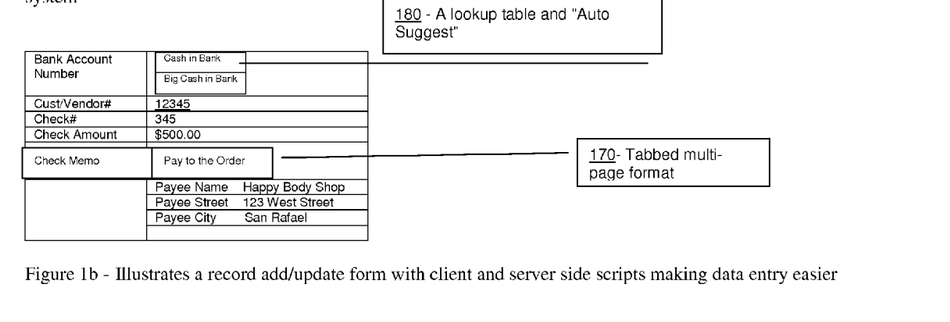

FIG. 1 shows the basic features of using a web-based system for managing the financial, customer, and inventory data of a retail dealership. As shown in FIG. 1, using a browser enables a sort by each column 110, quick search 120, or filtering with an advanced search 130 with multiple criteria 160. The invention also provides for exporting the data in various formats 140. When a user moves their mouse over the record and a preview of the linked data is displayed 150. If a user clicks on the record again, the data is presenting in tabbed multi-page views 170 providing a way for the users to jump back and forth between tabs to enter or edit the data as desired. The user selects fields that use a lookup table and "Auto Suggest" 180 to keep the data entry consistent while entering or editing data.

In the example in FIG. 1, the general ledger is displayed in a browser. This same display is used for the inventories (vehicle and parts,) employees, sales, customers, or other various tables. A sort 110 of the display can be completed by clicking on the column heading once for ascending and again for descending. By using the "Quick Search" 120, a user can enter a portion of the account number, account name, or any other displayed field and all matching items are displayed. If the customers were being displayed, then the user might enter a portion of the phone number or the first few letters of the last name. If the user wants to enter multiple criteria in a search 160, for example, all accounts with an amount between $10,000 and $20,000 dollars for a range of dates between Jan. 1, 2007 and Jan. 14, 2007, then the novel method of an advanced search can be used 130. The search form submits a request to the web based relational database server using a server side script and the results are displayed 110 and then can be sorted, printed or downloaded to various file formats 140. In order to reduce accessing the web based relational database server, a user can move their mouse over the record and a preview of the linked data is displayed using client side scripts 150. The preview shows the same data in the linked file, but in a window that totals the records. This window is not the dreaded blocked "pop-up" window, rather a hovering preview window 150 within the application. When a record is not found, then the user can enter a new record using a tabbed multi-page format 170 or edit the record that was found. When a field on the tab is a selection field 180, then the application does an "Auto suggest" with a lookup table to keep the data entry consistent while entering or editing data.

Figure 2:
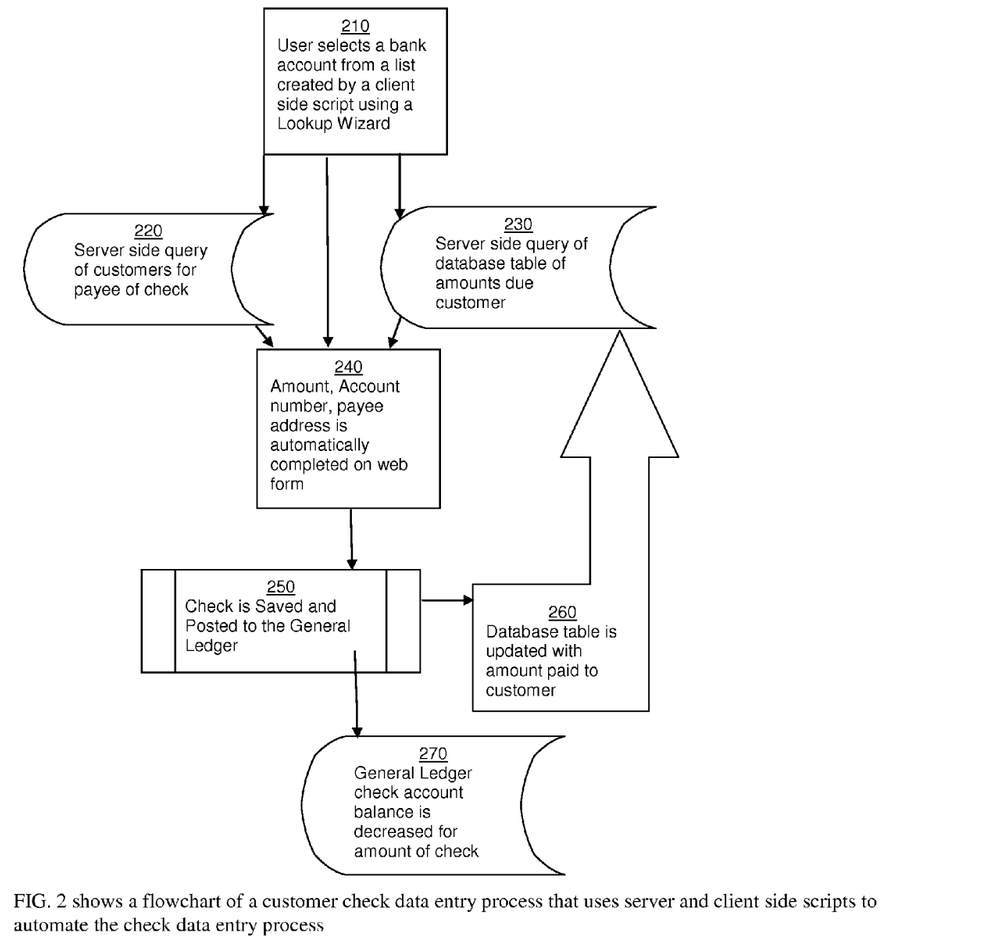

FIG. 2 is a flow chart of the typical processing of data using server side scripts for calculations. These steps include the user entering data 210 and then selecting data from setup tables 220 or related source tables 230. The server side script creates calculated fields 240. The calculated fields and stored fields create transactions are then posted 250, which decrease or increase balances 270 and then the related source tables are updated 260.

In the example in FIG. 2, when a user wants to quote a payment to a customer, they enter 210 the terms such as the amount of desired monthly payments. The user then selects from the vehicle inventory table the customer's desired vehicle. The price is retrieved from this related table 230 and the amount financed is calculated.

TABLE US-00001 srever side script example that creates the amount financed field

```
//Get variables like the price the customer is paying, their down
payment and the amount given for their trade-in 210
<?php
function ds_amtfincalc( ) {
    $Price = $_SESSION["Price"];
    $Discount = $_SESSION["Discount"];
    $TradeNet = $_SESSION["TradeNet"];
    $DownPayment = $_SESSION["DownPayment"];
    $TotalAdds = $_SESSION["TotalAddsPrice"];
    $RebateTotalNonTax = $_SESSION["TotalRebatesNonTaxable"];
    $RebateTotalTax = $_SESSION["TotalRebatesTaxable"];
    $TotalFees = $_SESSION["TotalFees"];
    $TotalLifeAHPremiumTaxable =
    $_SESSION["TotalLifeAHPremiumTaxable"];
    $TotalLifeAHPremiumNonTaxable =
    $_SESSION["TotalLifeAHPremiumNonTaxable"];
    $TotalServiceContractsPriceTaxable =
    $_SESSION["TotalServiceContractsPriceTaxable"];
    $TotalServiceContractsPriceNonTaxable =
    $_SESSION["TotalServiceContractsPriceNonTaxable"];
    // Determine the Amount Financed Amount by taking the price,
    subtracting their trade-in and down payment, charging sales tax
    and adding any products purchased 240
        $amttax = $Price − $Discount − $TradeNet − $DownPayment +
        $TotalServiceContractsPriceTaxable +
        $TotalLifeAHPremiumTaxable + $TotalAdds + $TotalFees −
        $RebateTotalNonTax;
        $taxrate = ds_taxratedeals( );
        $SalesTax = $amttax * $taxrate;
        $amt = $amttax − $RebateTotalTax + $SalesTax
        +$TotalLifeAHPremiumNonTaxable +
        $TotalServiceContractsPriceNonTaxable;
    $_SESSION["AmtFinancePrice"] = $amt;
    $_SESSION["SalesTax"] = $SalesTax;
return $amt;
}
?>
```

The user selects a bank 220 and in that setup table are the specifications for the interest calculated method used by that bank. Each bank can use a different method to calculate interest (finance charges.) Then the sever side script calculates the monthly payment based this setup for each bank.

TABLE US-00002 srever side script example that creates the monthly payment amount field

```
// Amounts entered by the user 210
function ds_paymentcalc( ) {
    $amt = $_SESSION["AmtFinancePrice"];
    $Rate = $_SESSION["Rate"];
```

TABLE US-00002-continued srever side script example that creates the monthly payment amount field

```
    $Days = $_SESSION["DaysToFirstPayment"];
    $Term = $_SESSION["Term"];
    $Term = $Term *−1;
    $pos = strlen($Rate);
    $pos2 = strlen($Term);
// Calculations of simple interest formula used by selected bank 220
    if ($Rate >1) {
        $Rate = $Rate/100;
    }
    if ($pos <1) {
        $pay = $amt;
        return $pay;
    }
    elseif ($Rate == 0) {
        $pay = $amt;
        return $pay;
    }
```

TABLE US-00002-continued srever side script example that creates the monthly payment amount field

```
    elseif ($pos2 <1) {
        $pay = $amt;
        return $pay;
    }
    elseif ($Term==0) {
        $pay = $amt;
        return $pay;
    }
    else {
    $pos1 = (1+$Rate/12);
    $pay = ($amt*($Rate/12))/((1− pow($pos1, $Term)));
    return $pay;
    }
```

In this example, when the sale is complete, the deal is posted with a server side script to the General Ledger 250 and the balance of an account, increases or decreases.

TABLE US-00003 srever side script (dealpost) that posts the car deal and updates tables

```
// This takes the user data 210 and vehicle selected data 230 along
with amounts calculated 240 and posts to the general ledger 250
function dealpost ($conn)
{
if ($_SESSION['countok']==0){
$today = date(c);
$hdrsql = "SELECT * FROM deals WHERE (DealID='$_SESSION[DealID]' AND
QuoteID = '$_SESSION[QuoteID]' AND StoreID = '$_SESSION[StoreID]')";
    $resulthdr = mysql_query($hdrsql);
    while ($row = mysql_fetch_assoc($resulthdr)) {
    $StoreID = $row["StoreID"];
    $Journal = "CarDeals";
    $RefDesc = $row["BuyerFirstName"];
    $RefDesc .= " ";
    $RefDesc .= $row["BuyerMidName"];
    $RefDesc .= " ";
    $RefDesc .= $row["BuyerLastName"];
    $custname = $RefDesc;
    $adate = $today;
    $slp = $row["Sales1Name"];
    $AccountNumber = $row["SaleAccount"];
    $SaleAccount = $row["SaleAccount"];
    $custid = $row["CustID"];
    $fimgr = $row["FIMgrName"];
    $linessql = "SELECT * FROM glaccountsetup WHERE
    (AccountNumber='$AccountNumber' AND StoreID =
    '$_SESSION[StoreID]')";
    $resultname = mysql_query($linessql);
    while ($row = mysql_fetch_assoc($resultname)) {
    $AccountName = mysql_real_escape_string($row["AccountName"]);
    $groupid = $row["GroupID"];
    $typecode = $row["TypeCode"];
    $chaindebit = $row["ChainDebit"];
    $chaincredit = $row["ChainCredit"];
        }
    $CreatedBy = CurrentUserName( );
    $PostingDate = $today;
    $LastChangedBy = CurrentUserName( );
    $LastChangedDate =ew_CurrentDate( );
    $LastChangedTime=ew_CurrentTime( );
    $LastChangedTerminal=ew_CurrentUserIP( );
// Get calculated information 240
    $hdrsqldq = "SELECT * FROM dealsquote WHERE
(DealID='$_SESSION[DealID]' AND QuoteID = '$_SESSION[QuoteID]' AND
StoreID = '$_SESSION[StoreID]')";
    $resultdq = mysql_query($hdrsqldq);
        while ($row = mysql_fetch_assoc($resultdq)) {
            $Amount = $row["Price"];
            $StockNum = $row["StockNum"];
            $Reference = $row["DealID"];
            $ControlNumber = $row["StockNum"];
            $ControlName = $RefDesc;
            $ControlAlternate = $row["VIN"];
            $VIN = $row["VIN"];
```

TABLE US-00003-continued srever side script (dealpost) that posts the car deal and updates tables

```
            $last8 = substr($VIN,−8);
            $PostingDescription = $slp;
            $bank = $row["Bank"];
            $newused = $row["NUD"];
        $SalesTax = $row["SalesTax"];
    }
}
// Get bank information 220
    $hdrsqlbk = "SELECT * FROM dealsquotebanknameselect WHERE
(Name='$bank' AND StoreID = '$_SESSION[StoreID]')";
    $resultbk = mysql_query($hdrsqlbk);
        while ($row = mysql_fetch_assoc($resultbk)) {
            $AmtDueAccountNumber = $row["AmtDueAccountNumber"];
            $ReserveReceivableAccount =
            $row["ReserveReceivableAccount"];
            $ReserveIncomeAccountNew =
            $row["ReserveIncomeAccountNew"];
            $ReserveIncomeAccountUsed =
            $row["ReserveIncomeAccountUsed"];
}
// Create posting header 250
    mysql_query("insert into gljvhdr (StoreID, Reference, Journal,
    ReferenceDescription, AccountingDate,
    CreatedBy, LastChangedBy, LastChangedDate,
    LastChangedTime, LastChangedTerminal) values
    ('$_SESSION[StoreID]', '$Reference', '$Journal', '$RefDesc',
    '$adate', '$CreatedBy', '$LastChangedBy ', '$LastChangedDate',
    '$LastChangedTime', '$LastChangedTerminal')")
        or die(mysql_error( ));
            $voucherid = mysql_insert_id( );
            $_SESSION['voucherid']=$voucherid;
}
//Note: The script lines for posting of doc fees, rebates, aftermarket,
commissions, we owes were removed from script to reduce example's
length 250
    }
mysql_query("insert into gljvlines (StoreID, VoucherID, AccountNumber,
AccountName, Amount, ControlNumber, ControlName, ControlAlternate,
PostingDescription, CreatedBy, LastChangedBy, LastChangedDate,
LastChangedTime, LastChangedTerminal)   values ('$_SESSION[StoreID]',
'$voucherid', '$AccountNumber', '$AccountName', '$Amount',
'$ControlNumber', '$ControlName', '$ControlAlternate',
'$PostingDescription', '$CreatedBy', '$LastChangedBy ',
'$LastChangedDate', '$LastChangedTime', '$LastChangedTerminal')") or
die(mysql_error( ));
        if ($SalesTax >0){
            $Amount = $SalesTax * (−1);
            $AccountNumber = $SalesTaxAccount;
            $linessql = "SELECT * FROM glaccountsetup WHERE
            (AccountNumber='$AccountNumber' AND StoreID =
            '$_SESSION[StoreID]')";
            $resultname = mysql_query($linessql);
        while ($row = mysql_fetch_assoc($resultname)) {
            $AccountName =
            mysql_real_escape_string($row["AccountName"]);
            $groupid = $row["GroupID"];
            $typecode = $row["TypeCode"];
    }
mysql_query("insert into gljvlines (StoreID, VoucherID, AccountNumber,
AccountName, Amount, ControlNumber, ControlName, ControlAlternate,
PostingDescription, CreatedBy, LastChangedBy, LastChangedDate,
LastChangedTime, LastChangedTerminal)   values ('$_SESSION[StoreID]',
'$voucherid', '$AccountNumber', '$AccountName', '$Amount',
'$ControlNumber', '$ControlName', '$ControlAlternate',
'$PostingDescription', '$CreatedBy', '$LastChangedBy ',
'$LastChangedDate', '$LastChangedTime', '$LastChangedTerminal')") or
die(mysql_error( ));
    }
// Create posting JV 250
    $Amount = $Amount * (−1);
    $ControlName = $custname;
    $ControlAlternate = $VIN;
    $PostingDescription = $Description;
mysql_query("insert into gljvlines (StoreID, VoucherID, AccountNumber,
AccountName, Amount, ControlNumber, ControlName, ControlAlternate,
PostingDescription, CreatedBy, LastChangedBy, LastChangedDate,
LastChangedTime, LastChangedTerminal)   values ('$_SESSION[StoreID]',
'$voucherid', '$AccountNumber', '$AccountName', '$Amount',
'$ControlNumber', '$ControlName', '$ControlAlternate',
```

TABLE US-00003-continued srever side script (dealpost) that posts the car deal and updates tables

```
'$PostingDescription', '$CreatedBy', '$LastChangedBy ',
'$LastChangedDate', '$LastChangedTime', '$LastChangedTerminal')") or
die(mysql_error( ));
// Chain Credit and Chain Debit removed from example 250
}
    $_SESSION[cardposted] = 1;
    echo "<div align=\"left\" style=\"color:#FFFFFF;background-
    color:#f8981D;
// Notice to the user that posting was completed 270
    font-weight:bold\">Car Deal Voucher #$_SESSION[voucherid] created
    successfully.</div><br />";
    header( 'Location: dealsselectedquoterecapvlist.php?' ) ;
}
?>
```

After the deal is posted, the customer's trade-in is inserted into the vehicle inventory table 260 using the data collected during the data entry process 210 and the purchased vehicle status is set to sold.

Example of Server Side Script to Change Status to Sold

```
//This updates the vehicle inventory table 260
    $status = "Sold";
$result = mysql_query("UPDATE vehicleinventory SET Status ='$status'
WHERE (VIN='$VIN' AND StockNumber = '$StockNum' AND
StoreID = '$_SESSION[StoreID]')");
```

Example of PHP Script to Add Customer's Trade-in to the Inventory Table

```
// This add the customer's trade-in 260 to the vehicle table
function updatetrade($conn)
{
    // Get deal date 310
$hdrsql = "SELECT * FROM deals WHERE (DealID='$_SESSION[DealID]' AND
QuoteID = '$_SESSION[QuoteID]' AND StoreID = '$_SESSION[StoreID]')";
    $resulthdr = mysql_query($hdrsql);
    while ($row = mysql_fetch_assoc($resulthdr)) {
    $DateReceived = $row["DealDate"];
}
    $Type = "InStock";
    $status = "InActive";
    $CreatedBy = CurrentUserName( );
    $LastChangedBy = CurrentUserName( );
    $LastChangedDate =ew_CurrentDate( );
    $LastChangedTime=ew_CurrentTime( );
    $LastChangedTerminal=ew_CurrentUserIP( );
// Get trade-in Information for 260
$trsql = "SELECT * FROM dealsquotetrades WHERE
(DealID='$_SESSION[DealID]' AND QuoteID = '$_SESSION[QuoteID]' AND
StoreID = '$_SESSION[StoreID]')";
    $resulttr = mysql_query($trsql);
        while ($rowtr = mysql_fetch_assoc($resulttr)) {
            $custid = $rowtr["StoreID"];
            $VIN = $rowtr["VIN"];
            $StockNum = $rowtr["StockNumber"];
            $VIN = $rowtr["VIN"];
            $LicenseNumber = $rowtr["LicenseNumber"];
            $Year = $rowtr["Year"];
            $Make = $rowtr["Make"];
            $Model = $rowtr["Model"];
            $Color = $rowtr["Color"];
            $Odometer = $rowtr["Odometer"];
            $VehicleDescription .= $Year;
```

-continued

```
            $VehicleDescription .= " ";
            $VehicleDescription .= $Make;
            $VehicleDescription .= " ";
            $VehicleDescription .= $Model;
            $Trim = $rowtr["Trim"];
            $FuelType = $rowtr["FuelType"];
            $transa = $rowtr["Automatic"];
            $transm = $rowtr["Manual"];
            $PS = $rowtr["PowerSteering"];
            $Air = $rowtr["Air"];
            $Body = $rowtr["Body"];
            $Cylinder = $rowtr["Cylinder"];
            $Radio = $rowtr["Radio"];
            $CarTruck = $rowtr["CarTruck"];
            $PowerBrakes = $rowtr["PowerBrakes"];
            $PowerWindows = $rowtr["PowerWindows"];
            $Tilt = $rowtr["Tilt"];
            $ABS = $rowtr["ABS"];
            $DaytimeLights = $rowtr["DaytimeLights"];
            $Roof = $rowtr["Roof"];
    }
        if ($transa == "Y") {
            $Trans = "A";
    }
        elseif ($transm == "Y") {
            $Trans = "M";
    }
// Check for existing customer vehicle record and inventory removed
from example
else {
mysql_query("UPDATE vehicleinventory SET StoreID =
'$_SESSION[StoreID]', Status = '$status', DateReceived =
'$DateReceived', PowerWindows ='$PowerWindows', PowerBrakes =
'$PowerBrakes', PowerSteering = '$PS', Tilt = '$Tilt', ABS = '$ABS',
Air = '$Air', DaytimeLights = '$DaytimeLights', Roof = '$Roof',
CarTruck = '$CarTruck', Body = '$Body', LastChangedBy =
'$LastChangedBy', LastChangedDate = '$LastChangedDate', LastChangedTime
= '$LastChangedTime', LastChangedTerminal = '$LastChangedTerminal'
        WHERE VIN = '$VIN'") or die(mysql_error( ));
}
        $_SESSION[tradeupdated] = 1;
        header( 'Location: dealsselectedquoterecapvlist.php?' ) ;
}
?>
```

Figure 3:
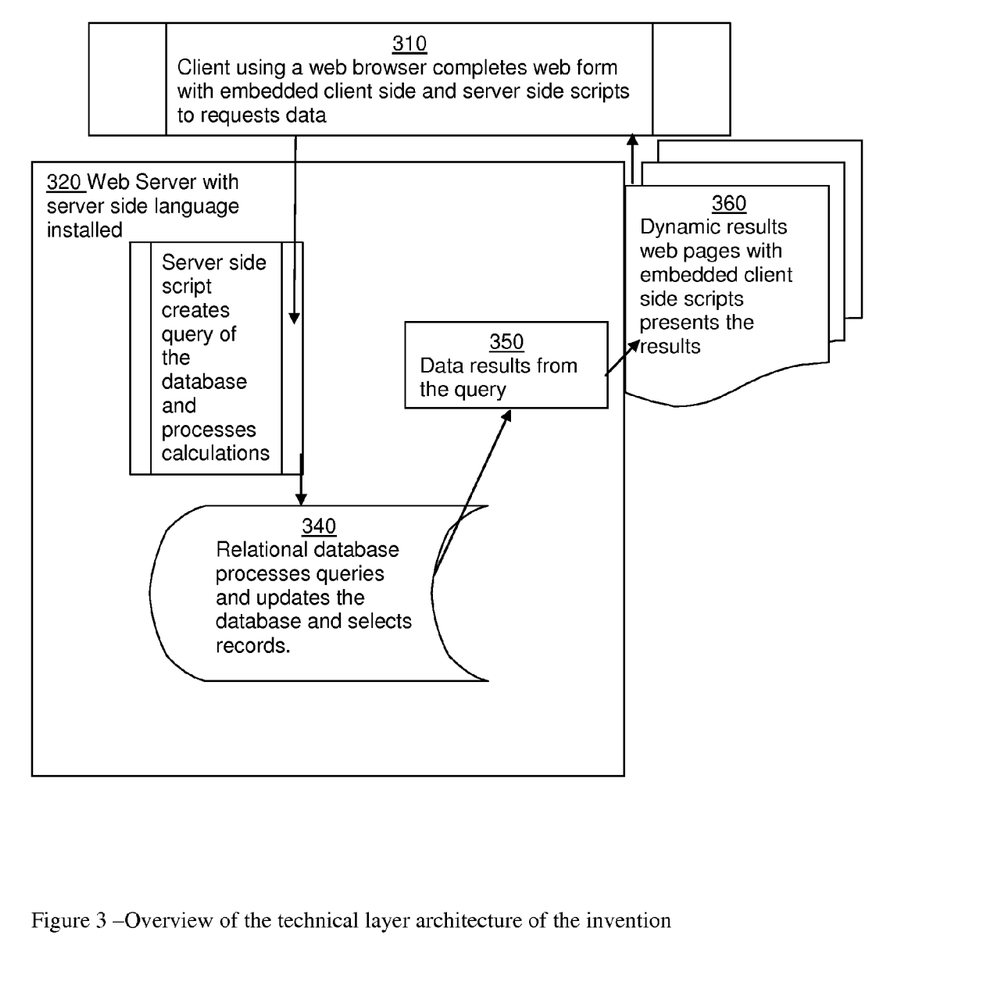

FIG. 3 is an overview of the technical layer architecture of the invention. The first layer is the web browser 310 that makes a request with a form and server side script to the next layer; a web server 320 with server side scripting language installed. The web server processes the script 330 and queries the third layer; a web server relational database 340. The results 350 are formatted using web application tools into dynamic web pages sent back to the web browser 360.

The web browser 310 has an advantage of being able to use any browser. This browser can have specific features like a spell checker or changing the text size. The web server 320 can be any format as long as it has a scripting language installed. The server side scripts 330 process calculations and send queries to the database. The latest web server relational databases 340 has the new features of views that can be updated similar to tables, but users, based on their security to see different versions of the same table data. The dynamic pages of the results 350 from the database are created in web pages that depend on customized CSS (stylesheets) to present the data in an attractive and user friendly format 360. Embedded in these web pages 360 are client side scripts that reduce the need to re-query the data presenting a preview of a link file.

In view of the many possible embodiments to which the principles of the disclosed invention may be applied, it should be recognized that the illustrated embodiments are only preferred examples of the invention and should not be taken as limiting the scope of the invention. Rather, the scope of the invention is defined by the following claims. We therefore claim as our invention all that comes within the scope and spirit of these claims.

We claim:

1. A method for managing the integrated database records of an automotive, truck, RV, motorcycle, bus or boat dealerships in a browser comprising:
   a. providing a web server with a relational database that contains tables for financial accounting records, vehicle, labor and parts inventory records, sales transaction records, and customer records that are related to each other by either the customer number, vehicle identification number (VIN), stock number, part number, repair order number, employee number, dealership company number, or a combination thereof;
   b. the database further:
      i. automating data entry by filling in the prices, descriptions, finance rate, interest method, customer type or sales type in one or more setup tables;
      ii. filtering field choices based on user security or previous field selections in one or more lookup tables; and
      iii. selecting forms based on the user's security level in one or more form tables;
   c. connecting to the database to retrieve user security records, table access rights, and user function permissions in a web application executed in a web browser;

d. entering a username and password in a login page in the web application;
e. obtaining the security clearance to specific functions, records and tables based on the entered username and password;
f. performing the functions of adding, updating, importing, or deleting the records directly in the integrated database tables through one or more scripts embedded in web forms within the web application;
g. further performing the functions of printing, displaying, searching, filtering and exporting records through the scripts and based on the security clearance obtained, whereby the web application performs three distinct search functions that filter the database records directly from the browser display of table records using both client side and server side scripts comprised of the following steps:
   i. performing quick searches by the user of the application in a quick search box on a browser display page listing of customer records, wherein the quick search function is performed by the client side script embedded in the list page that send a server request for only matching table records and ignoring all the other fields on the display;
   ii. refreshing the browse display of the page;
   iii. displaying the new listing of customer records filtered by the requested first or last name and enables the quick search function to repeat based on the filtered list using client side scripts;
   iv. wherein the quick search function is performed on at least one of: first or last name from a display of customer records, account number and account names from a display of financial records, vehicle identification numbers (VIN) and stock numbers from a display of the vehicle inventory records, repair order number from a display of repair orders, vehicle sale deal number from a display of vehicle sales records, and part numbers from a display of the parts inventory records;
   v. performing advanced searches by the user of the application on a table containing financial accounting, customer, inventory, and sales transaction records;
   vi. searching on multiple fields, options and conditions using client side scripts;
   vii. providing record field values from the searched table as a selected range;
   viii. limiting the search of financial accounting transaction records for a particular customer, type of vehicle model sale history, or type of parts customer with server side scripts to provide a record field value from related records;
   ix. performing custom searches using a search panel on the browser display, wherein the custom search enables:
      1. filtering financial records in stages; first by the amount of the transaction, then those for a particular customer, and then again those for a type of vehicle, labor or parts sale;
      2. filtering customers first by their type, second by their sales person, and third for a range of last sold or service dates;
      3. filtering inventory records by quantity on hand, price range, desired payment amount, color, year, make or a combination of fields; and
      4. filtering sales transaction by their territory, salesperson, gross profit amount, sales type, or a range of dates;
h. providing client and server side scripts in the web forms that:
   i. require that the financial accounting records have valid customer, employee and inventory control numbers;
   ii. require that parts, labor and vehicle inventory records have valid financial account numbers; and
   iii. require that sales transactions have valid customer, employee and inventory records.

2. The method of claim 1, wherein the browser display of the database records in the web application also shows related records from other tables in the databases which comprises:
   a. a listing of customers with a hyperlink on the displayed record's row that enables a transparent overlay view of a customer's owned vehicles records, service and sales history records, contact history records and related financial transaction records with an active link to these related records;
   b. a listing of repair order records with a hyperlink on the displayed record's row that enables a transparent overlay view of the customer's owned vehicles records, recommended or declined service records, prior service history records, special ordered parts records, labor and parts records, other items records, payment detail records and customer contact records, with an active link to these related records;
   c. a listing of parts sales records with a hyperlink on the displayed record's row that enables a transparent overlay view of the details of each part sold records, other item records, payment detail records, special ordered parts records, and the customer contact history records, with an active link to these related records;
   d. a listing of vehicle sales records with a hyperlink on the displayed record's row that enables a transparent overlay view of the details of the sale records, pending quote records, and customer contact history records, with an active link to these related records;
   e. a listing of financial account numbers, account names, and the balance in the accounts with a hyperlink on the displayed record's row that enables a transparent overlay view of the detailed transaction records for the account number, related source document records like vehicle, labor, and parts sales transaction records with an active link to these related records; and
   f. a listing of vehicle, labor and parts inventory records with a hyperlink on the displayed record's row that enables a transparent overlay view of the previous sales history records, pending sales to customers records, and order records with an active link to these related records.

3. The method of claim 1, whereby the user adds, edits or deletes records in the integrated database after performing a search function that is comprised of the following steps:
   a. searching, by a user, for a vehicle present at the automotive, truck, RV, motorcycle, bus, or boat dealership by entering the VIN number of the vehicle and if the VIN number is not located in the database then the record is added along with information found in a linked master VIN decoder database;
   b. adding, by the user, the related financial accounting record for the vehicle by clicking on an "Add Acct" link, wherein the server-side script adds a new record into the financial accounting table with cost and vendor information from the vehicle inventory record;
   c. searching, by the user, for a part by entering the part number and if the part number is not located in the database then the user adds a part inventory record, pricing information, and description information from a linked manufacturer database;

d. adding, by the user, the related financial accounting records for the part by clicking on the "Add Acct" link, wherein the server side script adds a new record into the financial accounting table with cost and vendor information from the parts inventory record;

e. searching, by the user, for a pending parts, repair or vehicle sales transaction record and if not found, adding, by the user, a new sales transaction record using client side scripts to search and select an existing customer and if the existing customer is not found, then a server side script adds the existing customer to the database;

f. search, by the user, for an inventory item to add to the sales transaction record and if the requested vehicle, part, or labor repair code is not found, then a server side script adds the vehicle, part, or labor repair code to the respective tables;

g. adding or editing, by a user, a vehicle part, repair, or sales transaction record and if the customer's contact information for the sales invoice is changed, enabling the user to select a client side script button to update the customer's master database record with the new address, phone number and other contact information using serverside scripts;

h. editing, by a user, a parts inventory record and if a part number is superseded by the manufacturer, enabling the user to select a client side script button to update the parts inventory master inventory database with the new part number and then the server side script finds related sales records and updates prior sale history with the new part number; and i. deleting, by a user, the vehicle sales transaction record using a client side script causing a server side script to delete the related accessory, insurance, extended warranty, license fees, and sales tax records from database.

4. The method of claim 3, wherein the steps of the user during the update of the database further comprises:

a. selecting, by a user, the make or manufacturer of the vehicle, and then selecting the model from the one or more lookup tables filtered using client side scripts by the make previously selected by the user;

b. selecting, by a user, the account number for the financial record from the one or more setup tables of account numbers and account names filtered by the dealership(s) that the user possesses appropriate security clearance for;

c. selecting, by a user, a part number record from the master parts table only for the make, model, or trim level of the vehicle being repaired;

d. selecting, by a user, a technician field of a repair order labor record whereby the technician records from the employee setup table are filtered by each technician's skill level to match the skill level for the labor record and available time to perform the repair based on the time required for the repair and the amount of time that the technician already has labor jobs assigned; and e. adding, by a user, new records to the lookup, setup, and master record tables if the user possesses appropriate security clearance.

\* \* \* \* \*